(12) United States Patent
Finsy et al.

(10) Patent No.: US 11,439,976 B2
(45) Date of Patent: Sep. 13, 2022

(54) ADVANCED POROUS CARBON ADSORBENTS FOR CO$_2$ CAPTURE AND SEPARATION

(71) Applicant: SOLVAY SA, Brussels (BE)

(72) Inventors: Vincent Finsy, Halle (BE); Eric Pierre Dubois, Wasseiges (BE)

(73) Assignee: Solvay SA, Brussels (BE)

( * ) Notice: Subject to any disclaimer, the term of this patent is extended or adjusted under 35 U.S.C. 154(b) by 717 days.

(21) Appl. No.: 16/349,693

(22) PCT Filed: Nov. 17, 2017

(86) PCT No.: PCT/EP2017/079542
§ 371 (c)(1),
(2) Date: May 14, 2019

(87) PCT Pub. No.: WO2018/091630
PCT Pub. Date: May 24, 2018

(65) Prior Publication Data
US 2020/0070123 A1 Mar. 5, 2020

(30) Foreign Application Priority Data

Nov. 17, 2016 (EP) .................................. 16199421
Nov. 30, 2016 (EP) .................................. 16201573

(51) Int. Cl.
*B01J 20/20* (2006.01)
*B01D 53/02* (2006.01)
(Continued)

(52) U.S. Cl.
CPC .............. *B01J 20/20* (2013.01); *B01D 53/04* (2013.01); *B01J 20/28042* (2013.01);
(Continued)

(58) Field of Classification Search
CPC . C04B 38/0032; C04B 38/0006; C04B 35/52; C01B 32/05; C01B 32/50;
(Continued)

(56) References Cited

U.S. PATENT DOCUMENTS 2,983,640 A * 5/1961 Knoll ...................... E04C 2/365
428/116
3,647,551 A * 3/1972 Reed et al. ........... H01M 4/043
252/182.1
(Continued)

FOREIGN PATENT DOCUMENTS

WO 2015081317 A2 6/2015
WO 2015109381 A1 7/2015
(Continued)

OTHER PUBLICATIONS

M. M. Alam et al., "Facile synthesis of dual micro/macroporous carbonaceous foams by templating in highly concentrated water-in-oil emulsions", Microporous and Mesoporous Materials (2013) vol. 182, pp. 102-108.
(Continued)

*Primary Examiner* — Frank M Lawrence, Jr.
(74) *Attorney, Agent, or Firm* — Osha Bergman Watanabe & Burton LLP (57) ABSTRACT

The present invention concerns a process for manufacturing a porous carbonaceous monolith structure comprising the steps of (i) introducing a precursor material comprising particles comprising a halogenated polymer having a melting point in a mold; (ii) forming a shaped body comprising aggregates of the particles of the precursor material, by concurrently applying to the precursor material a pressure P ranging from 10 to 300 bars when the halogenated polymer is a vinylidene chloride homopolymer and from 10 to 150 bars when the halogenated polymer differs from a vinylidene chloride homopolymer, and maintaining the precursor mate-
(Continued)

rial at a temperature $T_1$ ranging from $T_{1,min}=20°$ C. to $T_{1,max}=T_m-50°$ C. wherein $T_m$ is the melting point of the halogenated polymer, and; (iii) optionally cooling then demolding the shaped body; (iv) introducing the shaped body in a furnace; (v) causing the pyrolysis of the halogenated polymer in the furnace until the porous carbonaceous monolith structure is obtained.

12 Claims, 1 Drawing Sheet

(51) Int. Cl.
*C01B 32/50* (2017.01)
*B01D 53/04* (2006.01)
*B01J 20/28* (2006.01)
*B01J 20/30* (2006.01)

(52) U.S. Cl.
CPC ... *B01J 20/28045* (2013.01); *B01J 20/28071* (2013.01); *B01J 20/3007* (2013.01); *B01J 20/3078* (2013.01); *C01B 32/50* (2017.08); B01D 2253/102 (2013.01); B01D 2253/311 (2013.01); B01D 2253/3425 (2013.01); B01J 2257/504 (2013.01); B01J 2220/4812 (2013.01)

(58) Field of Classification Search
CPC ....... Y02C 20/40; Y02P 20/151; B01D 53/02; B01D 53/04; B01D 2253/102; B01D 2253/311; B01D 2253/3425; B01D 2257/504; B01J 20/20; B01J 20/28042; B01J 20/28045; B01J 20/28057; B01J 20/28068; B01J 20/28071; B01J 20/3007; B01J 20/3078; B01J 2220/4812

USPC ............. 96/108; 95/139; 502/400, 416, 418, 502/437; 428/116
See application file for complete search history.

(56) References Cited

U.S. PATENT DOCUMENTS

| | | | |
|---|---|---|---|
| 4,820,681 | A | 4/1989 | Chang et al. |
| 5,292,706 | A | 3/1994 | Chang et al. |
| 6,294,501 | B1 | 9/2001 | Chang |
| 6,743,278 | B1 * | 6/2004 | Carruthers ......... B01D 53/0407 96/108 |
| 8,615,812 | B2 * | 12/2013 | Wojtowicz ........ C04B 35/63476 296/187.02 |
| 2002/0020292 | A1 * | 2/2002 | Wojtowicz ............. B01D 53/02 96/108 |
| 2002/0025290 | A1 * | 2/2002 | Chang ................ B01J 20/28004 423/418 |
| 2004/0107838 | A1 | 6/2004 | Carruthers |
| 2012/0131973 | A1 * | 5/2012 | Greenidge ............... B01J 20/10 423/430 |
| 2012/0180660 | A1 | 7/2012 | Wilson et al. |
| 2013/0298769 | A1 | 11/2013 | Petruska et al. |

FOREIGN PATENT DOCUMENTS

| | | |
|---|---|---|
| WO | 2016003680 A1 | 1/2016 |
| WO | 2016018437 A1 | 2/2016 |

OTHER PUBLICATIONS

C.S. Tiwary et al., "Chemical-free graphene by unzipping carbon nanotubes using cryo-milling", Carbon (2015) vol. 89, pp. 217-224.
J. Lee et al., "Short carbon nanotubes produced by cryogenic crushing", Carbon (2006) vol. 44, Issue 14, pp. 2984-2989.

* cited by examiner

ADVANCED POROUS CARBON ADSORBENTS FOR $CO_2$ CAPTURE AND SEPARATION

This application is a U.S. national stage entry under 35 U.S.C. § 371 of International Application No. PCT/EP2017/079542 filed Nov. 17, 2017, which claims priority to European application No. 16199421.5 filed on Nov. 17, 2016 and to European application No. 16201573.9 filed on Nov. 30, 2016. The entire contents of these applications are explicitly incorporated herein by this reference.

The present invention concerns a process for manufacturing a porous carbonaceous monolith structure. It also concerns the manufacture of a shaped body comprising aggregates of particles comprising a halogenated polymer. It pertains to a carbonaceous monolith structure, a honeycomb porous carbonaceous structure both presenting a microporosity and at least one of an intra-particle macroporosity and an inter-particles macroporosity. It also pertains to the use of said porous carbonaceous monolith or of said honeycomb porous carbonaceous structures for extracting $CO_2$ from a gas composition by selectively adsorbing $CO_2$ gas.

It is generally admitted that the use of solid adsorbents for purification can offer an economic, energetic and ecological advantage over conventional processes such as distillation, liquid based absorption processes or extraction processes. A few examples of separation technologies include pressure swing adsorption (PSA), temperature swing adsorption (TSA), vacuum swing adsorption (VSA), electric swing adsorption (ESA) and combination of vacuum and temperature swing adsorption (VTSA) or combination of vacuum and pressure swing adsorption (VPSA). Although both PSA and TSA are commercially available technologies and are widely used in the industry, the application of adsorption technologies in processes where very large feed stream volumes need to be treated still remains challenging. This is particularly true for the capture and purification of $CO_2$ from $CO_2$ containing feed streams such as flue gas and natural gas.

TSA involves a first step for the selective adsorption of one component at low temperature and a second step where a temperature rise of the adsorbent is responsible for the increase of the mole fraction of the adsorbed component in the gas phase, hence purifying the product stream. In order to render TSA process viable, a rapid temperature-swing adsorption (RTSA) process, where the adsorbent can be rapidly cycled through adsorption, regeneration, and cooling steps, is required.

The assembly of adsorbents into high aspect ratio structures such as hollow fibers, laminates and honeycombs, wherein the thin wall dimensions allow for a rapid heat and mass transport, are promising. Generally, structured adsorbents, like monoliths, with interconnected and branched macroporous channels are superior in performance compared to conventional beads and granules.

Porous carbon has been used in many applications such as water treatment, air purification or gas storage. Carbonization under inert atmosphere of various precursors has been considered to produce efficient materials. Generally, carbonization is followed by an activation step in an oxidative atmosphere to enhance the surface area so that the materials can be used as porous carbon.

The carbonization of vinylidene chloride or fluoride polymers is an advantageous process because the thermal decomposition of such polymers is triggered without any need of catalytic input and because the resulting carbonaceous materials do not required any activation step to generate desired porosity. While both vinylidene chloride and fluoride polymers may be good candidates as precursor of porous carbonaceous structure, vinylidene chloride is generally preferred as its decomposition requires less demanding temperatures than vinylidene fluoride does and, as its thermal decomposition generates hydrochloric acid which is easier to handle than hydrogen fluoride.

Vinylidene chloride polymer as precursor of porous carbonaceous material is well documented. However, only few documents deal with the manufacture of carbon monolith starting from such polymer. Indeed carbon monoliths are generally manufactured by mixing porous carbon powders with a binder and by pressing the resulting mixture into appropriate shape. Among them, WO2015/109381 discloses the manufacture of polyvinylidene chloride (PVDC) monolith by mixing of PVDC particles with a PVDC latex followed by drying of the mixture under vacuum at relatively low temperature. As a result, the dried latex ensures the cohesion of the PVDC particles in the monolith acting as a binder for the particles. The PVDC monolith is then heated by increasing at a slow rate the temperature and thus is stepwise pyrolyzed under inert atmosphere in a mold to give a carbonaceous material. This method has the advantage that the binder and the particles are of the same chemical nature and that consequently, they shall follow the same degradation pathway to give the carbonaceous material. However, there is a good chance that said binder blocks the access to the porosity of the resulting carbonaceous monolith.

US 2013/0298769 discloses the use of carbonaceous materials obtained from PVDC for manufacturing devices suitable for selective $CO_2$ capture. For this invention, PVDC is pyrolized under the form of discrete particles or in the form of a monolith. Optionally, an activation step is performed to get the desired porous structure. The exact procedure used to prepare the porous carbonaceous materials is not clearly described and nothing is told in this document about the macroporosity of the monoliths.

In US 2004/0107838, PVDC particles are pressure molded before being carbonized to give a porous monolith useful for the manufacture of devices capable of gas/fluid storage. According to the procedure, the pressure which is used is exceeding 600 bars, which is detrimental to the macroporosity of the final porous carbonaceous monolith.

Finally, US 2002/0025290 and U.S. Pat. No. 6,294,501 describe the synthesis and the grinding in the presence of ice of PVDC particles. The particle size distributions diagrams provided in US 2002/0025290 reveals that the ground PVDC comprises several populations of particles in term of size. Ground particles are further shaped into pellets and said pellets pyrolized to give porous carbonaceous objects which have dimensions in the range of several millimeters and a length to diameter ratio ranging from 1.0 to 1.5. Nothing is said about the cohesion of the particles in the pellets before and after pyrolysis. Both documents are silent about the macroporosity of the carbonaceous objects.

In the field of porous carbonaceous materials for gas adsorption, more particularly for $CO_2$ adsorption, it is well known that the amount of $CO_2$ adsorbed is, for a high proportion, due to the presence of micropores. Moreover, in order to ensure an efficient mass transfer of gas, which is a key parameter for high adsorption and desorption kinetics in fast cycling process, a highly connected macroporous network is required to supply the microporous network.

According to all the above, the applicant has identified some needs in the domain of the use of solid adsorbents for purification.

There is a need for the development of adsorption and desorption processes operating in fast cycles.

There is a need for the development of suitable adsorbents and of monolithic adsorbent structures for these processes.

There is a need for a shaped body made from agglomerated particles comprising a halogenated polymer manufactured without using any binder.

There is a need for an easy to perform and low demanding process for manufacturing such a shaped body having a high macroporosity.

There is a need for a carbonaceous monolith structure comprising particles; said particles exhibiting a microporosity for improved selective adsorption of gas and a macroporosity for enhanced mass transfer of said gas and/or of gaseous mixture comprising said gas.

There is a need for a porous carbonaceous monolith comprising such agglomerated particles presenting an inter-particles macroporosity.

There is a need for an easy to perform and low demanding process for manufacturing such monolith structures.

There is a need for agglomerated particles comprising a halogenated polymer wherein the cohesion between particles is strong enough to allow the manufacture of a shaped body having a length to width and/or a length to thickness ratio at least equal to 4.

There is a need for agglomerated carbonaceous particles wherein the cohesion between particles is strong enough to allow the manufacture of a carbonaceous monolith having a length to width and/or a length to thickness ratio at least equal to 4.

There is a need for honeycomb structures comprising sculpted or drilled carbonaceous monoliths, presenting a microporosity and at least one of an intra-particle macroporosity and an inter-particles macroporosity, having canals wherein a gas can circulate at high speed and in a laminar flow.

There is a need for such honeycomb structures having selective $CO_2$ capacity.

Finally there is a need for a simple, low time consuming and low cost process suitable for manufacturing these honeycomb structures.

All these needs and still other ones are advantageously met by a process for manufacturing a porous carbonaceous monolith structure comprising the steps of:

i—introducing a precursor material comprising particles comprising a halogenated polymer having a melting point in a mold, ii—forming a shaped body comprising aggregates of the particles of the precursor material, by concurrently applying to the precursor material a pressure P ranging from 10 to 300 bars when the halogenated polymer is a vinylidene chloride homopolymer and from 10 to 150 bars when the halogenated polymer differs from a vinylidene chloride homopolymer, and maintaining the precursor material at a temperature $T_1$ ranging from $T_{1,min}=20°$ C. to $T_{1,max}=T_m-50°$ C. wherein $T_m$ is the melting point of the halogenated polymer, and, iii—optionally cooling then demolding the shaped body, iv—introducing the shaped body in a furnace, v—causing the pyrolysis of the halogenated polymer in the furnace until the porous carbonaceous monolith structure is obtained.

As early knew by the skilled person, in the context of gas adsorption, more particularly of $CO_2$ adsorption using materials obtained by pyrolysis of polymers, which is the context of the present invention, carbonaceous material is understood as a material essentially or totally composed of carbon i.e. as a material which is substantially free or completely free of any other element than carbon.

The carbonaceous monolith according to the invention is generally composed of at least 90 wt. %, preferably of at least 95 wt. %, more preferably of at least 98 wt. % and even more preferably of at least 99 wt. % of carbon.

The halogenated polymer suitable for the present invention is advantageously chosen from vinylidene chloride polymers and vinylidene fluoride polymers.

When a vinylidene fluoride polymer is selected, it may be a vinylidene fluoride homopolymer or a vinylidene fluoride copolymer comprising repetitive units derived from at least one comonomer preferably chosen from the group consisting of trifluoroethylene, tetrafluoroethylene, hexafluoropropylene, chlorotrifluoroethylene and chlorofluoroethylene.

The inventors have found that vinylidene chloride polymers are particularly suitable for the invention. It may be a vinylidene chloride homopolymer or a vinylidene chloride copolymer comprising repetitive units derived from at least one comonomer preferably chosen from the group consisting of vinyl chloride, acrylonitrile, acrylic acid, alkyl acrylates, methacrylic acid and alkyl methacrylates.

When the vinylidene chloride polymer is a copolymer; it is advantageously a copolymer comprising repetitive units derived from vinyl chloride or an alkyl acrylate.

When the vinylidene chloride copolymer comprises repetitive units derived from an alkyl acrylate, this alkyl acrylate is preferably butyl acrylate or methyl acrylate; more preferably it is methyl acrylate.

The vinylidene chloride polymer preferably comprises at least 55% of repetitive units, with regard to the totality of the repetitive units, derived from (preferably resulting from the free radical polymerization of) vinylidene chloride, more preferably at least 65% and even more preferably at least 75%. As the skilled person will understand, the percentages (%) are molar percentages.

Good results have been obtained with IXAN® PV708, IXAN® PV919 and IXAN® PV925 vinylidene chloride copolymers, comprising vinyl chloride or methyl acrylate moieties, commercialized by Solvay Specialty Polymers.

Particles, comprising vinylidene fluoride or vinylidene chloride polymer, suitable for the invention are generally prepared via emulsion or suspension polymerization.

When the particles are prepared by emulsion polymerization, a step of coagulation of the polymer latex is required to obtain particles of desired mean diameter. This coagulation step may be performed according to any process well-known by a person having ordinary skill in the art for example by neutralizing the emulsifying agent, which is commonly anionic, using polyvalent cations.

The particles comprising the halogenated polymer are preferably prepared by a suspension polymerization process using at least one suspending agent and at least one organo-soluble free radical initiator.

The particles are generally containing less than 50 ppm of remaining monomer, preferably less than 30 ppm even more preferably less than 20 ppm. This low remaining monomer content can be obtained for example by a stripping process of the slurry or by any process well-known by a person skilled in the art. The particles are generally recovered from the slurry by filtration and may be washed before being dried. Drying is generally accomplished in a fluidized bed but any other process can be used.

As a result of their manufacture process, the particles comprising the halogenated polymer are generally highly porous.

The porosity of the particles comprising the halogenated polymer may be characterized by the amount of a plasticizer, properly selected by the person skilled in the art, absorbed by said polymer. The nature of the plasticizer is generally depending on the nature of said polymer. For the particles comprising vinylidene chloride polymer, the porosity may be characterized by the amount of di-iso-nonylphtalate (DINP) absorbed expressed in wt. %. For this purpose, the polymer powder is transferred in a stainless steel centrifugation tube with conical bottom (90°), containing a 0.8 mm opening at the bottom and a large excess (about twice the mass of the sample) of di-isononyl-phtalate (DINP) is added. After 15 minutes of absorption at room temperature, the DINP in excess is removed by centrifugation at 3200 g for 30 minutes. The amount of DINP absorbed by the polymer powder is expressed in weight percent of the total weight of the polymer sample introduced in the centrifugation tube.

Generally the DINP absorption by the vinylidene chloride polymer powder is at least 4 wt. %, preferably at least 8 wt. %, more preferably at least 10 wt. % and even more preferably at least 11 wt. %. Generally the DINP absorption by the polymer powder is at most 26 wt. %, preferably is at most 22 wt. %, more preferably at most 20 wt. % and even more preferably at most 18 wt. %.

The melting point of the polymer may be determined by differential scanning calorimetry using the peak temperature of the endotherm.

When the halogenated polymer is vinylidene fluoride polymer, the melting point is dependent upon the composition of the polymer. Generally the melting point is ranging from 120° C. to 175° C.

When the halogenated polymer is vinylidene chloride polymer, the melting point is also dependent upon the composition of the polymer. Generally the melting point is ranging from 130° C. to 210° C.

When the halogenated polymer is vinylidene chloride homopolymer, the melting point is generally ranging from 165° C. to 210° C.

The precursor material according to step i—comprises particles comprising the halogenated polymer and may comprise any other ingredient such as lubricant, dispersing agent, demolding agent, anti-adhesive agent, binder, filler . . . .

The particles according to step i—comprise the halogenated polymer and may comprise any other ingredients such as dispersing agent, thermal stabilizer, filler, plasticizer . . . .

Generally, the content of the particles comprising the halogenated polymer with regard to the total weight of the precursor material is at least 65 wt. %. It is preferably at least 75 wt. %, more preferably at least 85 wt. % and even more preferably at least 95 wt. %. Besides, the authors have found advantageous to use a precursor material essentially composed of the particles comprising the halogenated polymer and more advantageous to use a precursor material composed of particles comprising the halogenated polymer.

Generally, the content of the halogenated polymer with regard to the total weight of the particles is at least 65 wt. %. It is preferably at least 75 wt. %, more preferably at least 85 wt. % and even more preferably at least 95 wt. %. Besides, the authors have found advantageous to use particles essentially composed of the halogenated polymer and more advantageous to use particles composed of the halogenated polymer.

In a preferred embodiment, the mean diameter of the particles comprising the halogenated polymer is generally of at least 145 µm, and of at most 1000 µm, preferably of at most 400 µm. Good results can be obtained with particles having a mean diameter of at most 300 µm, possibly of at most 250 µm, eventually of at most 220 µm.

Besides, the span of the particles comprising the halogenated polymer is generally of at most 1.5, preferably of at most 1.2 and more preferably of at most 1.0.

The particle size may be determined by laser diffraction analysis with a Mastersizer 2000 equipment from Malvern. The sample is examined in ethanol with a stirring of 2000 rpm and an obscuration setting ranging from 3 to 10%. The refractive index used for vinylidene chloride polymers is 1.52. The mean diameter D(50) is the size in microns at which 50% of the sample is smaller and 50% is larger and the span is calculated as:

$$\text{span} = \frac{D(90) - D(10)}{D(50)}$$

wherein D(10) is the size, on the cumulative curve in volume of the distribution, at which 10% of the particles are smaller and D(90) is the size at which 90% of the particles are smaller.

The narrower the distribution, the smaller the span becomes.

It is an objective of the invention to provide a shaped body comprising aggregates of the particles comprised in the precursor material, by concurrently, in a mold, applying to the precursor material a pressure P ranging from 10 to 300 bars and preferably from 10 to 150 bars when the halogenated polymer is a vinylidene chloride homopolymer and from 10 to 150 bars when the halogenated polymer is a vinylidene chloride or vinylidene fluoride copolymer and maintaining the precursor material at a temperature $T_1$ ranging from $T_{1,min}=20°$ C. to $T_{1,max}=T_m-50°$ C. wherein $T_m$ is the melting point of the halogenated polymer.

At the temperature $T_1$, the pressure P is generally applied for a duration D of at least 0.5 minute, preferably of at least 1 minute, more preferably of at least 3 minutes, even more preferably of at least 5 minutes. At the temperature $T_1$, the pressure P is generally applied for a duration D not exceeding 15 minutes, preferably not exceeding 12 minutes, more preferably not exceeding 9 minutes, even more preferably not exceeding 6 minutes.

The combination of the temperature and of the pressure is an important parameter because it sets the cohesion of the shaped body. Thus, for particles comprising a given halogenated polymer, at a temperature below a threshold temperature value, a poor cohesion or no cohesion of the particles is observed. Similarly at a pressure below a threshold pressure value, a poor cohesion or no cohesion of the particles is observed.

Moreover, the combination of the temperature and of the pressure determines the intra-particle macroporosity and the inter-particles macroporosity of the shaped body. Thus the macroporosity collapses at least partially if a treatment at a too high temperature and/or at too high pressure is applied. Accordingly, an ideal combination of the temperature and of the pressure ensures a good adhesion between particles i.e. a good cohesion of the shaped body, while maintaining macroporosity inside the particles comprising the polymer close to the macroporosity of the discrete particles just after polymerization.

In the case of vinylidene chloride homopolymer, the temperature $T_1$ is generally of at least 20° C., preferably of at least 30° C., more preferably of at least 40° C. Besides, the temperature $T_1$ is generally of at most 170° C., preferably of at most 150° C., more preferably of at most 140° C., even more preferably of at most 130° C.

In the case of vinylidene chloride copolymers, the temperature $T_1$ is generally of at least 20° C., preferably of at least 30° C., more preferably of at least 40° C. Besides, the temperature $T_1$ is generally of at most 120° C., preferably of at most 110° C. and more preferably of at most 100° C.

The pressure P is preferably of at least 15 bars, more preferably of at least 20 bars.

Besides, in the case the vinylidene chloride polymer is a homopolymer, the pressure P may range from 10 to 200 bars, and is preferably from 10 to 150 bars.

All in all, in certain mandatory or preferred embodiments of the invention, depending on whether the halogenated polymer is a vinylidene chloride homopolymer or not, the pressure P is from 10 to 150 bars. More preferably, irrespectively of whether the halogenated polymer is a vinylidene chloride homopolymer or not, the pressure P is of at most 140 bars, at most 130 bars or at most 100 bars, still more preferably at most 60 bars and the most preferably at most 30 bars.

After cooling to room temperature, the shaped body is optionally unmolded before being engaged in a subsequent pyrolysis step.

The resulting shaped body is made of aggregated particles comprising the halogenated polymer presenting a porosity which is generally close to the porosity of the discrete particles just after polymerization.

The overall porosity of the shaped body may be characterized by the amount of plasticizer absorbed as previously described for the halogenated polymer powder. Said plasticizer may be properly selected by the person skilled in the art depending on the nature of the polymer.

For example, when the halogenated polymer is vinylidene chloride polymer, the overall porosity of the shaped body can be evaluated by the absorbed amount of di-isononylphtalate (DINP) expressed in wt. %.

Generally the DINP absorption by the shaped body is at least 3 wt. %, preferably is at least 6 wt. %, more preferably at least 9 wt. %. Generally the DINP absorption is at most 24 wt. %, preferably is at most 20 wt. %.

The shaped body is generally a solid having a shape selected from the list consisting of circular cylinders, elliptic cylinders and polygonal prisms. Preferably, the shaped body is a circular cylinder or a rectangular prism and more preferably a rectangular prism. Generally, the shaped body has a length to width and/or a length to thickness ratio of at least 4, preferably of at least 6 and more preferably of at least 8.

The length of the shaped body is generally of at least 1 cm, preferably of at least 8 cm and more preferably of at least 10 cm.

When the shaped body is a cylinder, thickness and width are equal to the diameter of the circular base. By polygonal prism is understood a prism the bases of which are polygonal. Just for the sake of example, one may advantageously consider triangular, tetragonal or hexagonal prisms.

It is another objective of the invention to provide a porous carbonaceous monolith adsorbent structure, by pyrolyzing the obtained shaped body made of aggregated particles comprising the halogenated polymer.

For this purpose, after optional unmolding, the shaped body is introduced in a furnace and causing the pyrolysis of the halogenated polymer in the furnace may be conducted in a step v which comprises:

va—bringing the temperature of the shaped body up to a temperature $T_2$ strictly above $T_{2,min}=T_m-50°$ C. and strictly below $T_{2,max}=T_m$, vb—maintaining the shaped body, at the temperature $T_2$ under inert gas flow, to cause the pyrolysis of the halogenated polymer and the formation of an infusible char, vc—bringing the temperature of the infusible char up to a temperature $T_3$ strictly above $T_{3,min}=T_m$ and strictly below $T_{3,max}=1300°$ C., preferably strictly below $T_{3,max}=900°$ C., vd—maintaining the infusible char, at the temperature $T_3$ under inert gas flow, to cause the pyrolysis of the halogenated polymer, thereby obtaining the porous carbonaceous monolith structure.

In the case of vinylidene chloride homopolymer, the temperature $T_2$ is generally of at least 150° C., preferably of at least 155° C., more preferably of at least 160° C. Besides, the temperature $T_2$ is generally of at most 210° C., preferably of at most 200° C., more preferably of at most 190° C., even more preferably of at most 180° C.

In the case of vinylidene chloride copolymers, the temperature $T_2$ is generally of at least 110° C., preferably of at least 120° C., more preferably of at least 130° C. Besides, the temperature $T_2$ is generally of at most 180° C., preferably of at most 160° C. and more preferably of at most 150° C.

The shaped body is maintained at the temperature $T_2$ under inert gas flow, to cause the pyrolysis of the halogenated polymer.

The inert gas flow generally comprises argon, helium or mixture thereof.

Optionally, after being introduced in the furnace and before being brought to the temperature $T_2$, the shaped body is maintained at a temperature close to the boiling point of water under inert gas flow for drying.

In the case of vinylidene chloride homopolymer, the temperature for drying is generally of at least 60° C. It is preferably of at least 70° C., more preferably of at least 80° C. and even more preferably of at least 90° C. Besides, the temperature for drying is generally of at most 140° C., preferably of at most 135° C. and more preferably of at most 130° C.

In the case of vinylidene chloride copolymers, the temperature for drying is generally of at least 60° C. It is preferably of at least 70° C., more preferably of at least 80° C. and even more preferably of at least 90° C. Besides, the temperature for drying is generally of at most 130° C., preferably of at most 120° C. and more preferably of at most 110° C.

As $T_{2,max}$ is strictly below the melting point (Tm) of the halogenated polymer, the dehydrohalogenation occurs without observing the collapsing neither of the structure of the shaped body, nor of the macroporosity of the particle. Actually, the exposure of the shaped body at this temperature causes the formation of an infusible char which is involved in further pyrolysis at higher temperature.

For final carbonization, the infusible char is brought up to a temperature $T_3$ strictly above $T_{3,min}=T_m$ and strictly below $T_{3,max}=1300°$ C., preferably strictly below $T_{3,max}=900°$ C., wherein $T_m$ is as previously defined.

In the case of vinylidene chloride polymers, the temperature $T_3$ is generally of at least 400° C., preferably of at least 450° C., more preferably of at least 500° C. Besides, the temperature $T_3$ is generally of at most 1300° C., preferably of at most 1100° C., more preferably of at most 1000° C., even more preferably of at most 900° C.

The infusible char is maintained at the temperature $T_3$ under inert gas flow, to cause the pyrolysis of the halogenated polymer, thereby obtaining the porous carbonaceous monolith structure. The resulting porous carbonaceous monolith is composed of individual porous carbonaceous particles sintered together thus conferring enhanced mechanical properties to the structure.

In another embodiment, causing the pyrolysis of the halogenated polymer is conducted stepwise at different increasing temperatures $\theta_1 \ldots$ to $\theta_n$ wherein $\theta_1 < \ldots < \theta_n$ and $2 \leq n \leq 6$. In a preferred embodiment, n=3.

Thus, the shaped body is introduced in a furnace and is optionally dried as previously described. Then, the temperature of the shaped body is increased up to a temperature $\theta_1$ at a heating rate $H_1$ and is held at this temperature, under inert gas flow, for duration $D_1$. Afterwards, the temperature is optionally raised up from $\theta_1$ to the successive temperatures $\theta_n$ at the successive heating rates $H_n$ and is maintained at these temperatures, under inert gas flow, for successive durations $D_n$.

When the halogenated polymer is vinylidene chloride homopolymer, $\theta_1$ generally ranges from 110° C. to 190° C., $\theta_n$ generally ranges from 200° C. to 1300° C. Preferably, $\theta_1$ ranges from 120° C. to 170° C. and $\theta_n$ ranges from 250° C. to 900° C.

The heating rate $H_1$ generally ranges from 1° C./min to 20° C./min. The heating rate $H_n$ generally ranges from 0.1° C./min to 20° C./min.

The duration $D_1$ generally does not exceed 72 h, preferably does not exceed 48 h, more preferably does not exceed 24 h and even more preferably does not exceed 20 h. The duration $D_1$ is generally at least 0.1 h, preferably at least 0.2 h, more preferably at least 0.5 h. The duration $D_n$ generally does not exceed 30 h, preferably does not exceed 25 h, more preferably does not exceed 20 h. The duration $D_n$ is generally at least 0.1 h, preferably at least 0.2 h, more preferably at least 0.5 h.

The porous carbonaceous monolith structure according to the invention presents a microporosity. According to the definitions provided by the International Union of Pure and Applied Chemistry (IUPAC), micropores have a width below 2 nm, while the mesopores have a width ranging from 2 nm to 50 nm and the macropores a width above 50 nm.

Microporosity is determined by $N_2$ porosimetry. The $N_2$ adsorption isotherm is determined using an ASAP 2020 Micromeritics equipment. The specific surface area ($S_{BET}$) is determined according to the ISO 9277:2010 norm (Determination of the specific surface area of solids by gas adsorption—BET method—Annex C: Surface area of microporous materials). The relative pressure, $P/P_0$, region in which the BET model has been applied is chosen in such a way that the C constant has a positive value. The pore size and pore size distribution is calculated using the Density Functional Theory, assuming slit like pores (Carbon slit pores by DFT, regularization 0.003).

In order to ensure an efficient gas adsorption the applicant has found advantageous that the carbonaceous monolith according to the invention have a BET surface area of at least 700 m²/g, more advantageous of at least 800 m²/g and even more advantageous of at least 900 m²/g.

The micropore volume, measured by $N_2$ porosity, is generally at least 0.2 ml/g, preferably at least 0.25 ml/g, more preferably at least 0.3 ml/g, even more preferably at least 0.34 ml/g and the most preferably at least 0.38 ml/g. The micropore volume generally does not exceed 0.7 ml/g.

In addition to the microporosity, the porous carbonaceous monolith structure according to the invention presents at least one of an intra-particle macroporosity and an inter-particles macroporosity.

Mercury porosimetry is used to determine the macroporous characteristics of the porous carbon samples. Measurements are performed with a Micromeritics Autopore 9520 porosimeter n°10. Measurement starts at vacuum up to 2 bars, followed by a measurement from 1 to 2000 bars. The sample size of the product is selected considering the measurement range of the dilatometers and in order to consume 30-50% of the capillary volume (about 500-700 mg). Type CD3P 35 ml volume powder dilatometers are used. Samples are dried at 150° C. in vacuum and quickly transferred to the dilatometer, which is then closed. Afterwards, vacuum is pulled until less than 1 mbar for 1 h. Calculations are performed with a contact angle 130° and a surface tension of 485 Dyne/cm and the accurate Hg temperature dependent density at around 25° C. Monoliths are broken down into pieces of 1 to 2 cm in order for them to fit in the dilatometers.

Figure 1:
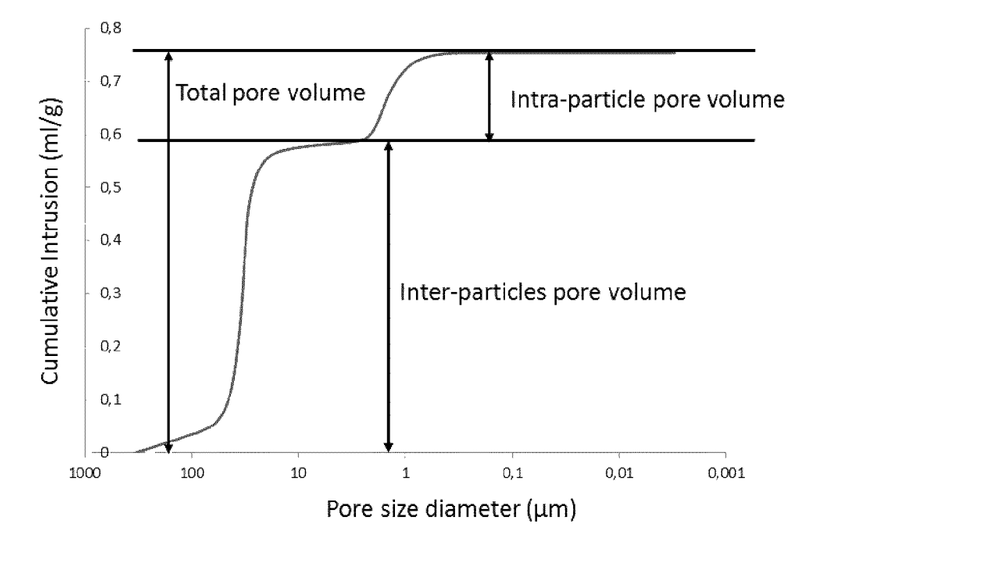
FIG. 1 is a Hg porosimetry curve which illustrates the incremental intrusion volume in function of the pore size.

FIG. 1 represents the Hg porosimetry curve which illustrates the incremental intrusion volume in function of the pore size. From the measured curves, the intra-particle (a) and the inter-particles (b) pore volumes are calculated from the total (c) pore volume (see FIG. 1). The curve showing the incremental intrusion volume in function of the pore size is used to calculate the intra-particle and the inter-particles mean pore size.

The intra-particle macropore volume, measured by Hg porosity, is generally of at least 0.03 ml/g, preferably of at least 0.05 ml/g, more preferably of at least 0.10 ml/g and even more preferably at least 0.15 ml/g. Besides, the intra-particle macropore volume generally does not exceed 0.40 ml/g.

The inter-particles macropore volume, measured by Hg porosity, is generally of at least 0.10 ml/g, preferably of at least 0.15 ml/g, more preferably of at least 0.20 ml/g, still more preferably of at least 0.25 ml/g and the most preferably of at least 0.27 ml/g. Besides, the inter-particles macropore volume generally does not exceed 0.90 ml/g.

The cumulated intra-particle and inter-particles macropore volumes or total macropore volume, measured by Hg porosity is generally of at least 0.12 ml/g, preferably at least 0.30 ml/g, more preferably at least 0.35 ml/g and even more preferably at least 0.40 ml/g.

Besides, the total macropore volume generally does not exceed 1.30 ml/g.

The intra-particle macropores have an average diameter, measured by Hg porosity, generally of at least 0.2 µm, preferably of at least 0.4 µm and more preferably of at least 0.5 µm. Besides, the intra-particle macropores have an average diameter which generally does not exceed 5 µm.

The inter-particle macropores have an average diameter, measured by Hg porosity, generally of at least 1 µm, preferably of at least 2 µm and more preferably of at least 2.5 µm. Besides, the inter-particle macropores have an average diameter which generally does not exceed 50 µm.

The porosity of the porous carbonaceous monoliths according to the invention may be optionally further modified by chemical or physical activation processes well known by the person skilled in the art.

The porous carbonaceous monolith is generally a solid having a shape selected from the list consisting of circular cylinders, elliptic cylinders and polygonal prisms. Preferably, the monolith is a circular cylinder or a rectangular prism and more preferably a rectangular prism. Generally, the porous carbonaceous monolith has a length to width and/or a length to thickness ratio of at least 4, preferably of at least 6 and more preferably of at least 8.

The length of the carbonaceous monolith is generally of at least 1 cm, preferably of at least 8 cm and more preferably of at least 10 cm.

It is also the object of the present invention to provide a grooved carbonaceous monolith presenting a microporosity and at least one of an intra-particle macroporosity and an inter-particles macroporosity, having canals wherein a gas can circulate at high speed and in a laminar flow. The grooved carbonaceous monolith may be manufactured by a method comprising sculpting the carbonaceous monolith structure according to the invention.

It is the object of the present invention to propose a method of manufacturing a grooved carbonaceous monolith, said method comprising:
  manufacturing a porous carbonaceous monolith structure by any process previously described, and
  sculpting the so-manufactured porous carbonaceous monolith structure. For example, straight channels may be cut along the length of the carbonaceous monolith to give individual grooved monolith.

The properties of porosity (microporosity, intra-particle and inter-particles macroporosities . . . ) of the grooved monolith are similar to the properties of the carbonaceous monolith as previously described.

The grooved monolith may have different wall thicknesses which are set during machining.

It is an object of the present invention to propose a honeycomb porous carbonaceous structure presenting a microporosity and at least one of an intra-particle macroporosity and an inter-particles macroporosity, having canals wherein a gas can circulate at high speed and in laminar flow.

In a preferred embodiment, the individual grooved monoliths are superimposed and assembled to give a honeycomb porous carbonaceous structure presenting a microporosity and at least one of an intra-particle macroporosity and an inter-particles macroporosity. The present invention also proposes a method of manufacturing a honeycomb porous carbonaceous structure presenting a microporosity and at least one of an intra-particle macroporosity and an inter-particles macroporosity, said method comprising:
  manufacturing grooved carbonaceous monoliths by the method previously described, and
  assembling the so-manufactured grooved carbonaceous monoliths.

Assembling of the monoliths is made either by sticking with glue or by wrapping up with a polymer film.

In another preferred embodiment, the honeycomb porous carbonaceous structure, presenting a microporosity and at least one of an intra-particle macroporosity and an inter-particles macroporosity, is manufactured by drilling the carbonaceous monolith structure of the present invention. The present invention also covers a method of manufacturing a honeycomb porous carbonaceous structure presenting a microporosity and at least one of an intra-particle macroporosity and an inter-particles macroporosity, said method comprising:
  manufacturing a porous carbonaceous monolith structure by the processes previously described, and
  drilling the so-manufactured porous carbonaceous monolith structure.

The properties of porosity (microporosity, intra-particle and inter-particles macroporosities . . . ) of the honeycomb porous carbonaceous structure are similar to the properties of the carbonaceous monolith as previously described. These honeycomb structures, independently from the way that they are manufactured, are another object of the present invention and may be characterized in that they have a particular number of cells per square inch unit (cpsi).

Generally, the honeycomb structure according to the invention has at least 50 cpsi, preferably at least 100 cpsi, more preferably at least 150 cpsi and even more preferably at least 200 cpsi. Besides, the honeycomb structure according to the invention has advantageously at most 1200 cpsi, preferably at most 800 cpsi and more preferably at most 600 cpsi.

Many applications can be found for the monolith or the honeycomb structure according to the invention especially in the fields of water treatment and gas purification.

Another aspect of the invention is the use of the porous carbonaceous monoliths for purifying a flue gas containing $CO_2$ by selectively adsorbing $CO_2$ gas.

The dynamic and selective $CO_2$ capacity of porous carbon monoliths and microbeads may be determined by experiments wherein a gas stream containing $CO_2$ and $N_2$ (15/85 by volume) is fed to a sample at constant flow rate. The flow rates of all the pure gasses are regulated by mass flow controllers. The sample outlet is connected to a mass spectrometer, measuring on-line the Ar and $CO_2$ concentration over the whole duration of the experiment. Prior to each experiment, the samples are activated in a pure $N_2$ stream (equal flow rate of the separation experiment) at ambient temperature or at 120° C. The monoliths are dried overnight under vacuum at 110° C. before installation in the experimental setup. All separation experiments are performed at room temperature (about 21° C.) and total flow rates of 50 ml/min to 200 ml/min or 500 ml/min. In order to determine the system dead time, a tracer gas steam (5 ml/min of Ar), is added to the $CO_2/N_2$ gas steam.

Experiments on monoliths are performed on monoliths with a length of 8 to 12 cm and a cross section of about 1 cm². Monoliths are directly connected to the in- and outlet tubing.

The selective $CO_2$ capacity, $Q_{CO2}$, is calculated by integration of the experimental curves $$Q_{CO2} = \frac{1}{M_{sample}} \int_{t=0}^{tend} (q'_0 - q'_t) dt$$

With $q_0'$ and $q_t'$ being respectively the mass flow at the column inlet at time zero and column outlet at time t. Time zero is experimentally determined by injecting a non-adsorbing tracer flow (Ar) in the feed stream. Time zero is chosen as the time at which the Ar experimental curve reaches the half of its maximum height.

The carbonaceous monoliths according to the invention have a selective $CO_2$ capacity, $Q_{CO2}$, generally of at least 15 mg/g, preferably of at least 20 mg/g, more preferably of at least 25 mg/g and even more preferably of at least 27 mg/g.

The porous carbonaceous monolith structures according to the invention may be used for any gas purifications. For example, $CO_2$ may be extracted and purified from flue gas or from a gas composition comprising natural and bio gas. $CO_2$ may also be extracted from the air contained in any local e.g. in a building, from the air blown by a heating, a ventilation or an air-conditioning installation. The porous carbonaceous monolith structures may be also used for natural and bio gas purification. They may also be used for air and water treatment applications. Finally, they may be used for gas storage and for catalysis applications. However, application fields are not limited to these examples.

Should the disclosure of any patents, patent applications, and publications which are incorporated herein by reference conflict with the description of the present application to the extent that it may render a term unclear, the present description shall take precedence.

PVDC Grades Selection

Commercial PVDC suspension resins from Solvay's Specialty Polymer PVDC division were used to prepare PVDC shaped bodies. Grades with different composition (type and amount of co-monomers and additives) and particle size have been evaluated. Some characteristics of the PVDC resins used in this example are reported in the table 1.

TABLE 1

Commercial PVDC resins

| Resin (particles) | Composition* | Melting point (° C.) | Mean diameter D50 (μm) | Span | Porosity DINP (wt. %) |
|---|---|---|---|---|---|
| IXAN® PV708 copolymer | VDC/VC | 169.8 | 204 | 0.81 | 11 |
| IXAN® PV919 copolymer | VDC/VC | 151 | 172 | 0.71 | 16-17.7 |
| IXAN® PV925 copolymer | VDC/MA | 158 | 201 | 0.92 | 13 |

*VDC: Vinylidene chloride;
VC: vinyl chloride;
MA: methyl acrylate

Preparation of PVDC Shaped Bodies According to the Invention

Binderless IXAN® PV708 PVDC shaped bodies were produced by compressing PVDC resins below their melting point. A rectangular frame of 3 mm thickness was filled with the resin and pressed at a temperature of 40° C. and a pressure of 28.8 bars. The pressure was maintained for 6 minutes at 28.8 bars at a constant temperature of 40° C. The resulting shaped bodies were composed of individual porous PVDC polymer particles agglomerated together. After cooling the shaped body was unmolded. Similar procedure was used to prepare shaped bodies starting from IXAN® PV919 and IXAN® PV925 copolymers.

Preparation of PVDC Shaped Bodies for Comparative Examples

Two types of PVDC shaped bodies were produced as comparative examples. The first one was produced by compressing IXAN® PV708 PVDC resin below its melting point at a pressure exceeding the pressure range used in the present invention for vinylidene chloride copolymer. A rectangular frame of 3 mm thickness was filled with resin and pressed at a temperature of 110° C. and a pressure of 192 bars. The pressure was maintained for 6 minutes at 192 bars at a constant temperature of 110° C. After cooling the shaped body was unmolded.

The second one was produced by using a PVDC latex as binder to prepare a shaped body of PVDC particles. For this purpose, 10 g of IXAN® PV708 PVDC resin were mixed with 8 g of a 60 wt. % PVDC latex to give a paste. A strand was then extruded at room temperature with a 10 ml syringe.

Porosity of PVDC Shaped Bodies

The overall porosity was determined by DINP adsorption at room temperature as previously described in the core of the specification. The results reported in table 2 illustrate the effect of the pressure onto the porosity of a shaped body manufactured at constant temperature. The trend was a decrease of the porosity with the increase of the pressure.

TABLE 2

Shaped body prepared at 85° C. from IXAN® PV925 resin, pressure effect

| | Shaped body | | | | |
|---|---|---|---|---|---|
| | 1 | 2 | 3 | 4 | 5 |
| Pressure | 19.2 | 28.8 | 38.4 | 48.1 | 67.3 |
| Porosity DINP (wt. %) | 11.3 | 10.7 | 8.6 | 8.0 | 6.3 |

The results of table 3 show the effect of the temperature onto the porosity of a shaped body manufactured at constant pressure. The trend was a decrease of the porosity with the increase of the temperature.

TABLE 3

Shaped body prepared at 28.8 bars from IXAN® PV925 resin, temperature effect

| | Shaped body | | | |
|---|---|---|---|---|
| | 1 | 2 | 3 | 4 |
| Temperature | 60 | 85 | 100 | 125 |
| Porosity DINP (wt. %) | 11.9 | 10.7 | 9.2 | 5.0 |

The results, contained in tables 2 and 3, give clear evidence that an ideal combination of the temperature and of the pressure may ensure a good adhesion between particles, i.e. a good cohesion of the shaped body, while maintaining the macroporosity inside the particles comprising the polymer. Moreover, when a good compromise between temperature and pressure was found, the intra-particle macroporosity in the shaped body was unexpectedly close to the intra-particle macroporosity of the commercial resin particles (compare porosity of IXAN® PV925 particles in table 1, i.e. 13 wt. % and porosity of shaped body 1 of table 3, i.e. 11.9 wt. %).

Preparation of Porous Carbonaceous Particles

A ceramic crucible containing about 20 g of IXAN® PV925 polymer powder was placed in a quartz tube, disposed in a 3 zone horizontal tubular furnace (carbolite HZS 12/900). The temperature was ramped from room temperature to 130° C. at a rate of 10° C./min and was held at that temperature for 1 h in order to dry the polymer powder. Then the temperature was further increased with a heating rate of 1° C./min to an intermediate temperature (i.e. 150° C.) and held at this temperature for 17 h. Finally, the temperature was increased to the carbonization temperature (i.e. 600° C.) at a heating rate of 10° C./min and held at this temperature for 1 h.

Preparation of a Porous Carbonaceous Monolith According to the Invention

The shaped body made from IXAN® PV925 PVDC was placed in a quartz tube disposed in a 3 zone horizontal tubular furnace (carbolite HZS 12/900). The temperature was then ramped from room temperature to 130° C. at a rate of 10° C./min and was held at that temperature for 1 h in order to dry the shaped body. Then the temperature was further increased with a heating rate of 1° C./min to an intermediate temperature (i.e. 150° C.) and held at this temperature for 17 h. Afterwards, the temperature was further increased to 300° C. with a heating rate of 1° C./min and held at this temperature for 1 h. Finally, the temperature was increased to the carbonization temperature (i.e. 600° C.) at a heating rate of 10° C./min and held at this temperature for 1 h. Similar procedure was used to prepare carbonaceous monoliths starting from shaped bodies issued from IXAN® PV919 and IXAN® PV708 PVDC.

Preparation of Porous Carbonaceous Monolith for Comparative Examples

The two PVDC shaped bodies produced as comparative examples were treated in a similar way as the shape bodies prepared according to the invention. However, their behaviors were quite different.

On one hand, the shaped body produced at a pressure of 192 bars and 110° C. behaved singularly. Indeed, some foaming was observed during the heating phases, which was likely due to accumulation of hydrogen chloride gas, produced by thermal degradation, followed by sudden release of said gas due to pressure increase. The poor efficiency for gas release by the porous network was probably the reason for this gas accumulation. This confirmed the trend that the porosity decreased with the increase of the pressure and/or of the temperature during shaped body preparation. As a consequence, it was not possible to obtain a suitable monolith starting from this shaped body. Indeed, the shape of the resulting monolith was irregular; its surface was covered by many craters and defects that render the monolith unsuitable for a compact application. Increasing the duration of the step at 150° C. up to several days did not solve the problem.

On the other hand, the shaped body, obtained by mixing PVDC particles and a PVDC latex, yielded a porous carbonaceous monolith after thermal treatment. In a first step, the strand, as described above, was introduced in a tubular furnace and the temperature was ramped from room temperature to 130° C. at a rate of 10° C./min before being held at that temperature for 1 h for drying. In a second step the temperature was further increased with a heating rate of 1° C./min to an intermediate temperature (175° C.) and held at this temperature for 17 h. Finally, the temperature was increased to the carbonization temperature (600° C.) at a heating rate of 10° C./min and held at this temperature for 1 h to obtain a carbonaceous monolith.

Porosities of Porous Carbonaceous Particles and Monoliths

Microporosity of the carbonaceous particles and monoliths was measured by $N_2$ porosimetry while macroporosity was evaluated by Hg porosimetry. Both techniques were previously described in the specification. The results confirmed that particles presented a microporosity combined with a macroporosity. They also revealed that the monoliths presented 3 kinds of porosity: a microporosity and a macroporosity, which were intra-particle porosities, and a macroporosity which was located between the particles, thus qualified as inter-particles macroporosity.

The results collected in table 4 clearly show that the micropore volume and the specific surface area of the monoliths obtained by the process according to the invention were similar to the micropore volume and the specific surface area of the corresponding particles, thus giving evidence that forming a shaped body, comprising aggregates of PVDC particles and further pyrolizing said shaped body, was surprisingly not detrimental to the microporosity of the final carbonaceous monolith.

TABLE 4

Microporosities and specific surface area of porous carbonaceous particles and monoliths

| | | Particles | | Monoliths | |
|---|---|---|---|---|---|
| | Composition | Micropore volume ($cm^3/g$) | $S_{BET}$ ($m^2/g$) | Micropore volume ($cm^3/g$) | $S_{BET}$ ($m^2/g$) |
| IXAN® PV708 PVDC | VDC/VC | 0.34 | 877 | 0.34* | 863* |
| IXAN® PV925 PVDC | VDC/MA | 0.37 | 955 | 0.38** | 940** |

*Monoliths manufactured from shaped bodies prepared at 28.8 bars and 40° C.
**Monoliths manufactured from shaped bodies prepared at 19.2 bars and 85° C.

Moreover, the results of table 5 clearly show that the intra-particle macropore volume and the intra-particle macropore mean size of the monoliths obtained by the process according to the invention were very close to the intra-particle macropore volume and the intra-particle macropore mean size of the particles in the case of IXAN® PV708 and of IXAN®PV925 PVDC, thus giving evidence that forming a shaped body, comprising aggregates of PVDC particles, and further pyrolizing said shaped body, was surprisingly not detrimental to the intra-particle macroporosity of the final carbonaceous monolith.

TABLE 5

Macroporosities of porous carbonaceous particles and monoliths

| | Particles | | Monoliths | | | | |
|---|---|---|---|---|---|---|---|
| | Intra-particle macropore | | Intra-particle macropore | | Inter-particle macropore | | Total macropore |
| | volume ($cm^3/g$) | mean size (μm) | volume ($cm^3/g$) | mean size (μm) | volume ($cm^3/g$) | mean size (μm) | volume ($cm^3/g$) |
| IXAN® PV708 PVDC | 0.09 | 1.45 | 0.05* | 1.2* | 0.40* | 30.5* | 0.46* |
| IXAN® PV925 PVDC | 0.20 | 2.4 | 0.17** | 1.6** | 0.57** | 33.5** | 0.75** |

* Monoliths manufactured from shaped bodies prepared at 28.8 bars and 40° C.
** Monoliths manufactured from shaped bodies prepared at 19.2 bars and 85° C.

Attempts to draw a $N_2$ adsorption/desorption isotherm of the porous carbonaceous monolith, obtained from the shaped body prepared by mixing PVDC particles and a latex, failed. Indeed, under conditions of evaluation similar to those used for monoliths obtained differently, no equilibrium could be obtained. It seemed that the access for the gas to the microporosity was considerably reduced. It was probably because the latex had filed or covered the macroporosities, thus preventing mass transfer of gas and consequently gas adsorption in the resulting carbonaceous monolith.

Preparation of Honeycomb Monoliths

Several straight channels, of 0.8 mm wide and 0.8 mm deep, were sculpted along the length of the porous carbon monoliths using a CNC Milling Machine (Datron Electronics, CAT 3D-M5). Individual monoliths of about 1.2 cm wide and 8 to 12 cm long, each containing 5 to 7 channels, were cut out from this grooved porous carbon monolith. Afterwards, the individual monoliths were superimposed and assembled giving porous carbon honeycomb monoliths with 5 or 6 levels.

Assembling of the monoliths was made by wrapping up with a polymer film. Finally, the grooved monoliths assembled in such way resulted into honeycomb monoliths with square channels and a cell density of 200 cpsi (cells per square inch).

The wall thickness of the individual monolith or of the grooved monolith (consequently of the honeycomb monoliths), was measured using a digital micrometer. The wall thickness value of the monolith was an average of 5 measurements made at 5 different places of said monolith, distanced from each other of 1 cm.

Selective $CO_2$ Capacity of Porous Carbonaceous Particles and Honeycomb Monoliths Experiments on particles were performed using a column with a length of about 10 cm and an internal diameter of 0.6 cm, packed with 0.5 to 0.9 g of adsorbent. Experiments on monoliths were performed on monoliths with a length of 8 cm and a cross section of about 1 cm². Monoliths were directly connected to the in- and outlet tubing.

The selective $CO_2$ capacities, $Q_{CO2}$, are reported in table 6.

TABLE 6

Selective $CO_2$ capacities $Q_{CO2}$ of porous carbonaceous particles and honeycomb monoliths

| | $Q_{CO2}$ (mg/g) | |
| --- | --- | --- |
| | Particles | Honeycomb monolith |
| IXAN ® PV708 PVDC | 27.5 | 26.2* |
| IXAN ® PV925 PVDC | 28.4 | 28.1** |
| CarboTech 200 cpsi | n.a. | 11.4 |

*Monoliths manufactured from shaped bodies prepared at 28.8 bars and 40° C.
**Monoliths manufactured from shaped bodies prepared at 38.5 bars and 85° C.

The results of table 6 give evidence that the process for manufacturing a porous carbonaceous monolith structure according to the invention i.e. comprising the steps of forming a shaped body comprising aggregates of the particles from the precursor material and of heating to cause the pyrolysis of the particles comprising the halogenated polymer, was unexpectedly not detrimental to the selective $CO_2$ capacity of the resulting porous carbonaceous monolith. Indeed, the values of $Q_{CO2}$ obtained for the monoliths were close to the values obtained for the corresponding particles.

Moreover, the honeycomb monoliths of the present invention had improved performances with regard to the performances of a commercially available honeycomb monolith from CarboTech AC GmbH. This result was quite surprising since the wall thickness of the PVDC based monoliths was much thicker (1 mm) compared to the wall thickness of the CarboTech monolith (0.35 mm) while both honeycomb monoliths had the same channel density. Indeed, the smaller wall thickness of the CarboTech monolith should give a clear advantage, over the wall thickness of the PVDC based monoliths according to the present invention, in term of accessibility to the porosity. The CarboTech monolith contained, next to a porous carbon adsorbent, an inert inorganic binder which actively decreased the adsorption capacity despite its small wall thickness.

The invention claimed is:

1. A method of manufacturing a grooved carbonaceous monolith, said method comprising sculpting a carbonaceous monolith structure obtained by a process for manufacturing a porous carbonaceous monolith structure comprising the steps of:
   i— introducing a precursor material comprising particles comprising a halogenated polymer having a melting point in a mold,
   ii— forming a shaped body comprising aggregates of the particles of the precursor material, by concurrently applying to the precursor material a pressure P ranging from 10 to 300 bars when the halogenated polymer is a vinylidene chloride homopolymer and from 10 to 150 bars when the halogenated polymer differs from a vinylidene chloride homopolymer, and maintaining the precursor material at a temperature $T^1$ ranging from $T_{1,min}=20°$ C. to $T_{1,max}=T_m-50°$ C. wherein $T_m$ is the melting point of the halogenated polymer, and,
   iii— optionally cooling then demolding the shaped body,
   iv— introducing the shaped body in a furnace,
   v— causing the pyrolysis of the halogenated polymer in the furnace until the porous carbonaceous monolith structure is obtained,
   wherein the carbonaceous monolith structure has a length to width and/or a length to thickness ratio of at least 4, and in that it presents a microporosity and at least one of an intra-particle macroporosity and an inter-particles macroporosity.

2. The method according to claim 1, wherein the pressure P ranges from 10 to 150 bars whatever the halogenated polymer.

3. The method according to claim 1 wherein step v comprises:
   $v_a$— bringing the temperature of the shaped body up to a temperature $T_2$ strictly above $T_{2,min}=T_m-50°$ C. and strictly below $T_{2,max}=T_m$,
   $v_b$— maintaining the shaped body, at the temperature $T_2$ under inert gas flow, to cause the pyrolysis of the halogenated polymer and the formation of an infusible char,
   $v_c$— bringing the temperature of the infusible char up to a temperature $T_3$ strictly above $T_{3,min}=T_m$ and strictly below $T_{3,max}=900°$ C.,
   $v_d$— maintaining the infusible char, at the temperature $T_3$ under inert gas flow, to cause the pyrolysis of the halogenated polymer, thereby obtaining the porous carbonaceous monolith structure.

4. The method according to claim 1 wherein the particles comprising the halogenated polymer have a mean diameter ranging from 145 μm to 400 μm.

5. A method of manufacturing a grooved carbonaceous monolith, said method comprising:
   manufacturing a porous carbonaceous monolith structure by a process for manufacturing a porous carbonaceous monolith structure comprising the steps of:
      i— introducing a precursor material comprising particles comprising a halogenated polymer having a melting point in a mold,
      ii— forming a shaped body comprising aggregates of the particles of the precursor material, by concurrently applying to the precursor material a pressure P ranging from 10 to 300 bars when the halogenated polymer is a vinylidene chloride homopolymer and from 10 to 150 bars when the halogenated polymer differs from a vinylidene chloride homopolymer, and maintaining the precursor material at a temperature $T_1$ ranging from $T_{1,min}=20°$ C. to $T_{1,max}=T_m-50°$ C. wherein $T_m$ is the melting point of the halogenated polymer, and,
      iii— optionally cooling then demolding the shaped body,
      iv— introducing the shaped body in a furnace,
      v— causing the pyrolysis of the halogenated polymer in the furnace until the porous carbonaceous monolith structure is obtained, and
   sculpting the so-manufactured porous carbonaceous monolith structure.

6. A grooved carbonaceous monolith obtained by the method of claim 1, wherein the grooved carbonaceous monolith presents a microporosity and at least one of an intra-particle macroporosity and an inter-particles macroporosity and has canals wherein a gas can circulate.

7. A method of manufacturing a honeycomb porous carbonaceous structure presenting a microporosity and at least one of an intra-particle macroporosity and an inter-particles macroporosity, said method comprising:
   manufacturing grooved carbonaceous monoliths by the method of claim 1, and
   assembling the so-manufactured grooved carbonaceous monoliths.

8. The method according to claim 7 wherein assembling the so-manufactured grooved carbonaceous monoliths is achieved by sticking with glue or by wrapping up with a polymer film.

9. A honeycomb porous carbonaceous structure obtained by the method of claim 7, wherein the honeycomb porous carbonaceous structure presents a microporosity and at least one of an intra-particle macroporosity and an inter-particles macroporosity and has canals wherein a gas can circulate.

10. A method for extracting $CO_2$ from a gas composition by selectively adsorbing $CO_2$ gas using the grooved monolith according to claim 6.

11. A method for extracting $CO_2$ from a gas composition by selectively adsorbing $CO_2$ gas using the honeycomb structure according to claim 9.

12. The method according to claim 1, wherein the pressure P ranges from 10 to 50 bars.

* * * * *